UNITED STATES PATENT OFFICE.

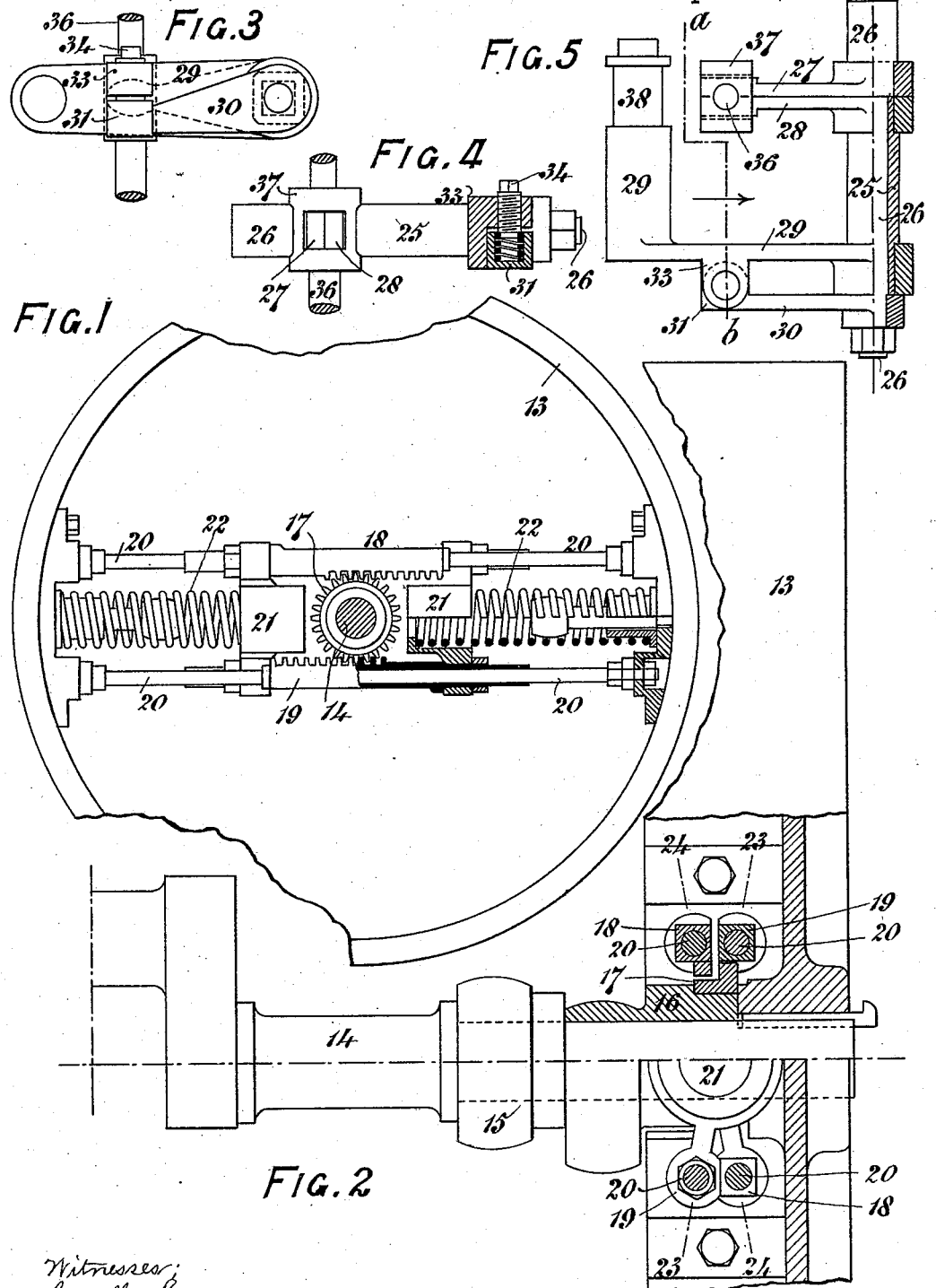

JOHN HANDSLEY DALES, OF LEEDS, ENGLAND.

STEAM-ENGINE.

SPECIFICATION forming part of Letters Patent No. 568,665, dated September 29, 1896.

Application filed September 21, 1895. Serial No. 563,198. (No model.) Patented in England May 17, 1894, No. 9,697, and in France June 24, 1894, No. 237,682.

*To all whom it may concern:*

Be it known that I, JOHN HANDSLEY DALES, civil engineer, a subject of the Queen of Great Britain, residing at No. 45 Lofthouse Place, Leeds, in the county of York, England, have invented new and useful Improvements in Steam and other Fluid-Pressure Engines, (for which I have obtained Letters Patent in Great Britain, No. 9,697, bearing date May 17, 1894, and in France, No. 237,682, bearing date June 24, 1894,) of which the following is a specification.

My invention relates more particularly, but not exclusively, to high-speed engines, such engines requiring special arrangements for governing the distribution of the steam or other fluid, as required, under variations of power and work and for taking up the wear of the working parts; and the object of my invention is to construct and fit such engines with special means and appliances for such and other requirements.

In order that my said invention may be particularly described and ascertained, reference is hereby made to the accompanying drawings, in which similar figures of reference indicate corresponding parts.

Figures 1 to 5 illustrate the construction of my improved governor, Fig. 1 being an elevation, partly in section, of an engine fly-wheel containing a centrifugal radial governor; Fig. 2, a sectional elevation at right angles to Fig. 1, and Figs. 3, 4, and 5 detail drawings relating to the same.

Referring to Figs. 1 and 2, 13 is the fly-wheel of an engine. 14 is the crank-shaft. 15 is an eccentric integral with a sleeve 16 and capable of being partially rotated upon the shaft, for the purpose of varying the position of the expansion-valve or the angle of advance of the main valve, according to the kind of valve to which it may be applied. 17 is a toothed wheel keyed to the sleeve 16 of the eccentric 15.

18 and 19 are two pairs of toothed racks, one of each pair being in gear with the toothed wheel 17, and the other rack of each pair being out of gear with the tooth-wheel 17 and merely used to balance those in gear with the wheel. These racks slide upon four guide-rods 20 20 and are fixed to or integral with spring-boxes 21 21. The springs 22 22 act partly so as to counterpoise the centrifugal force of the spring-boxes 21 and also in themselves act as centrifugal weights for the purpose of governing.

In the drawings two racks are shown to each spring-box, but one of the racks in each pair acts only as a centrifugal balance to the other and thereby prevents any cross strain arising upon the slides and guides. The rack 18 gears with the teeth of the wheel 17 on one side and the rack 19 gears with the teeth on the other side. In action the two spring-boxes and their attachments move toward the rim of the wheel by their centrifugal force overcoming the resistance of the springs. The dotted lines 23 24 indicate the relative positions of the pairs of racks. The slight friction of the centrifugal weights and other parts of the mechanism acting on the guides, or the friction of the sleeve on the shaft or bearing, may be further reduced by means of balls, rollers, or other well-known anti-friction devices.

Instead of linking the eccentric to an ordinary valve-rod sliding in a stuffing-box, I fit the end of the connecting-rod to a lever attached to a compound rocking spindle, passing through a stuffing-box attached to the valve-chest, for the purpose of reducing friction and providing for taking up wear. Figs. 3, 4, and 5 illustrate this part of my invention, Fig. 3 being an end view of Fig. 5, Fig. 4 a view, partly in section, on the line $a\,b$ of Fig. 5, and Fig. 5 being a plan of the arrangement.

25 is a hollow spindle which works in a stuffing-box attached to the valve-chest, the levers 29 and 30 being outside the valve-chest and the levers 27 and 28 inside. 26 is a solid spindle running through the sleeve 25. 27 28 are the two parts of the compound lever, the lever 27 being mounted on a square on the solid spindle 26 and the lever 28 being mounted on a square on the sleeve 25. Outside the valve-chest a lever 29 is mounted on the sleeve 25, and another lever, 30, is mounted on the solid spindle 26. The lever 30 is provided with a boss at 31, which is recessed to receive a spring 32, and the lever 29 is provided with a lug 33, through which a set-screw 34 passes, so that it may regulate the positions of the bosses 31 and 33. 36 is the valve-rod, and 37 is a slotted box forming part of the rod, into which the ends of the levers 27 and 28 are inserted. The end of the eccentric-rod from the eccentric 15 is attached to the neck 38 of the lever 29, whereby the motions of the eccentric-rod are communicated to the valve-spindle 36.

It will be evident that by screwing down or unscrewing the screw 34 the bosses 31 and 33 can be brought closer together or separated, thereby causing the ends of the levers 27 and 28 to take up any slackness in the valve-spindle slot 37, whereby the gear can be made to work without shake.

I claim—

1. In a centrifugal governor, the combination with a shaft and a fly-wheel keyed thereon, of an eccentric sleeved on said shaft, a toothed wheel rigidly mounted on said sleeve, toothed racks movably mounted on guide-rods carried by the fly-wheel, said racks engaging the opposite sides of the toothed wheel and operating when thrown out by centrifugal force to rotate said toothed wheel and shift the eccentric, and counterpoise-springs operating to force the racks toward the center of the fly-wheel but yielding under centrifugal force to permit the outward movement of the racks, substantially as described.

2. In a centrifugal governor, the combination with the shaft 14 and the fly-wheel 13 keyed thereon, of an eccentric 15 sleeved on said shaft, a toothed wheel 17 rigidly mounted on said sleeve, two pairs of toothed racks 18 and 19 arranged upon the opposite sides of said toothed wheel and movably mounted on guide-rods 20 carried by said fly-wheel, one of each pair of said racks engaging the toothed wheel and operating when thrown out by centrifugal force to rotate said toothed wheel and shift the eccentric, and counterpoise-springs operating to force the racks toward the center of the fly-wheel, but yielding under centrifugal force to permit the outward movement of the racks, substantially as described.

3. In a centrifugal governor, the combination with the shaft 14 and the fly-wheel 13 keyed thereon, of an eccentric 15 sleeved on said shaft, a toothed wheel 17 rigidly mounted on said sleeve, two pairs of toothed racks 18 and 19 arranged upon the opposite sides of said toothed wheel and movably mounted on guide-rods 20 carried by said fly-wheel, one of each pair of said racks engaging the toothed wheel and operating when thrown out by centrifugal force to rotate said toothed wheel and shift the eccentric, spring-boxes 21 carried by said racks, and coiled springs 22, arranged between said boxes and the periphery of the fly-wheel, substantially as described.

4. The combination with the valve-rod 36 provided with a slotted box 37, of the spindle 26 having journaled thereon a sleeve 25, the compound levers 27 and 28 arranged side by side and rigidly mounted respectively on said spindle and sleeve and at their ends seated in said slotted box, and means for turning the said spindle and sleeves in opposite directions to throw said levers apart, substantially as described and for the purpose specified.

5. The combination with the valve-rod 36 provided with a slotted box 37 of the spindle 26 having journaled thereon a sleeve 25, the compound levers 27 and 28 arranged side by side and rigidly mounted respectively on said spindle and sleeve and at their ends seated in said slotted box, the levers 29 and 30 rigidly mounted respectively on the sleeve and spindle, the hollow boss 31 carried by the lever 30 and having seated therein a spring 32, the lug 33 carried by the lever 29, the set-screw 34 projecting through said lug into contact with the spring 32, and a crank-arm 38, carried by the lever 29, substantially as described and for the purpose specified.

Dated August 3, 1895.

JOHN HANDSLEY DALES.

Witnesses:
   EDWD. WHITELEY,
   JOSH. HY. WHITAKER.